United States Patent Office 3,306,719
Patented Feb. 28, 1967

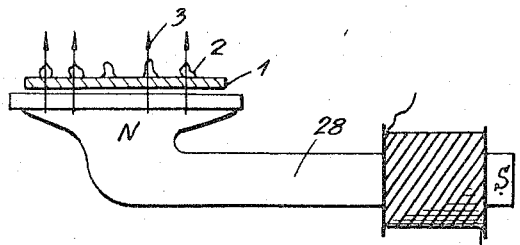
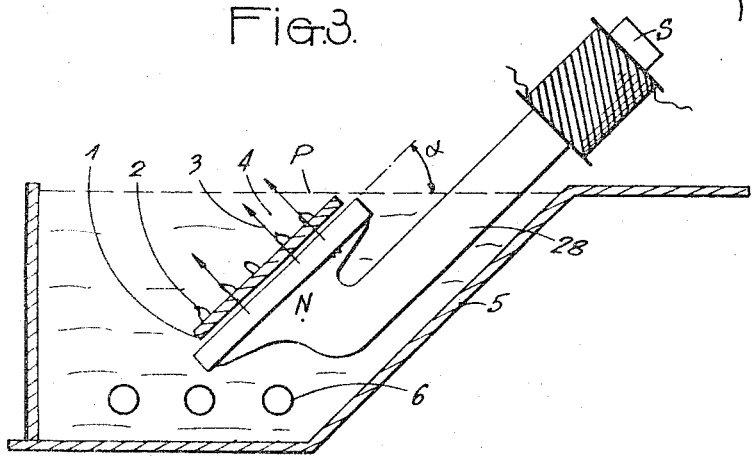
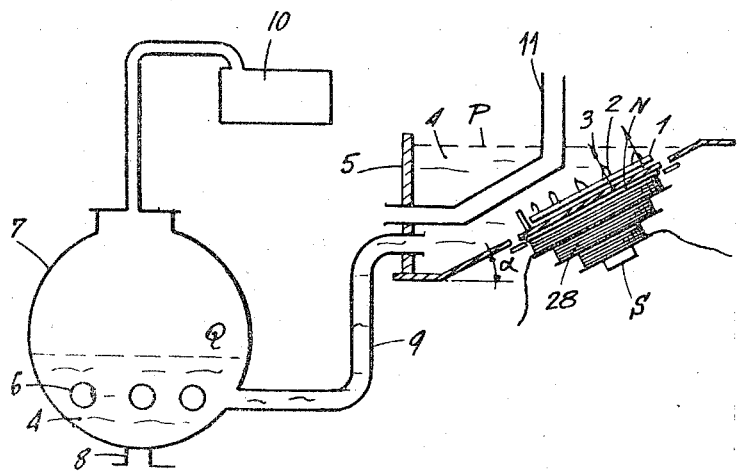

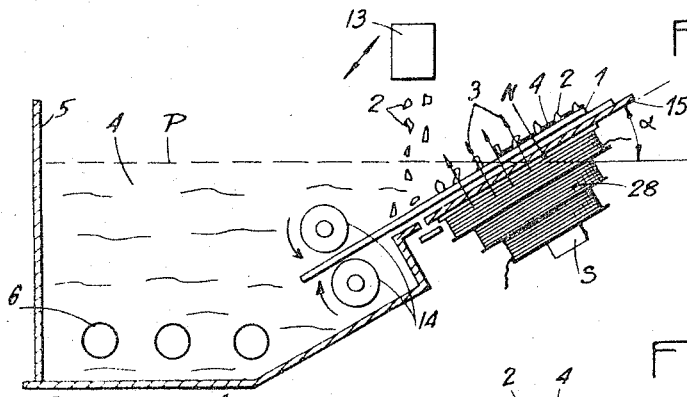

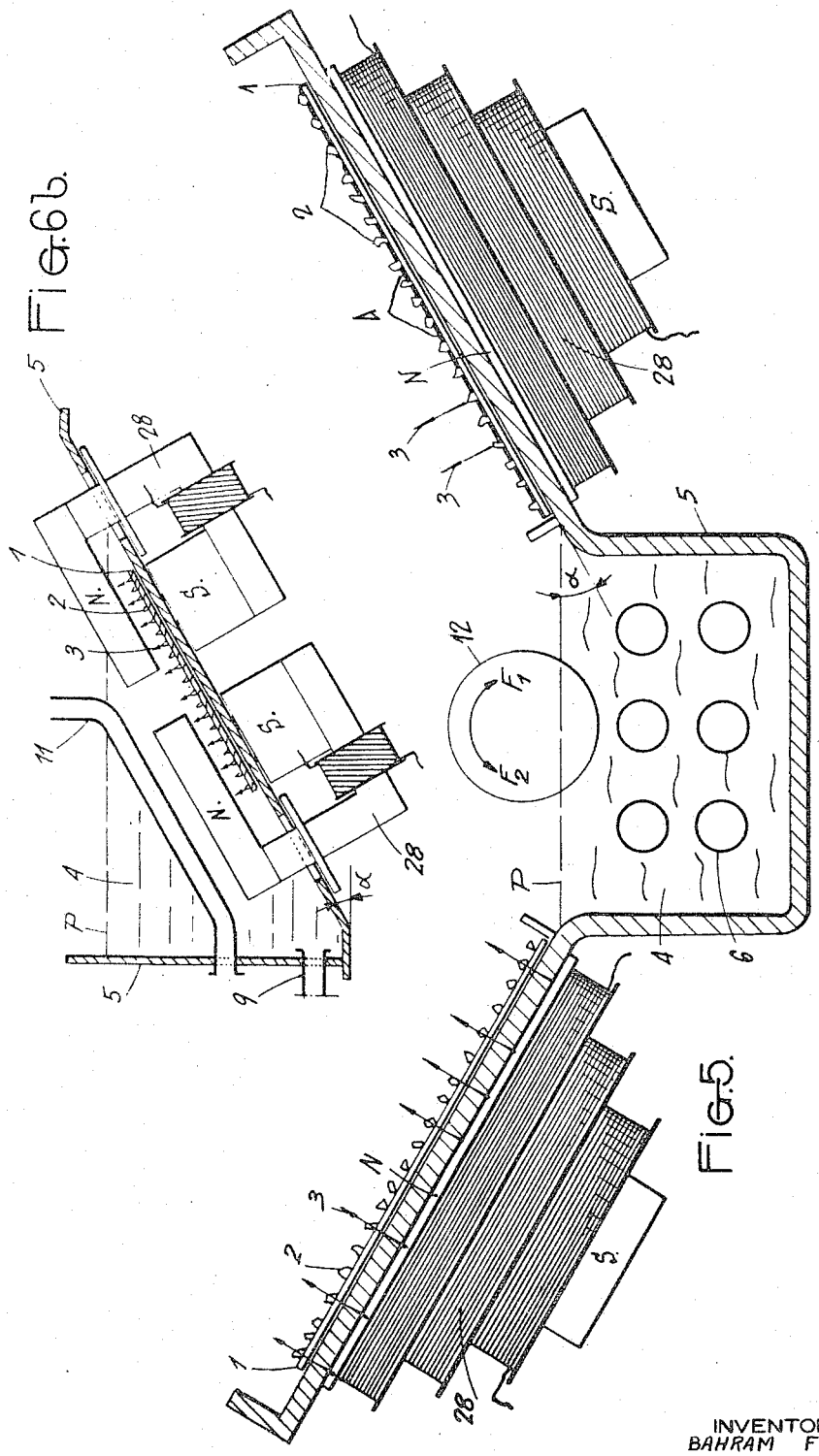

3,306,719
METHOD FOR PRODUCING RUGOUS AND ABRASIVE SURFACES AND PRODUCT THEREOF
Bahram Fringhian, 36 Blvd. Suchet, Paris, France
Filed Nov. 7, 1961, Ser. No. 150,684
Claims priority, application France, Nov. 8, 1960, 843,351
11 Claims. (Cl. 51—309)

The present invention relates to a method for producing rugous surfaces and, if desired, abrasive surfaces, said method using magnetic means for holding and orientating metal particles on a support.

The invention further relates to an apparatus for carrying out said method and to the new industrial products obtained by means of this apparatus and by application of said method.

There exist several methods for obtaining rugous or abrasive surfaces by fixing hard metal grains to a support, in particular methods which comprise spreading on the support a welding product in suspension in a liquid (e.g. triethanolamine or silicone oil), sprinkling metal grains thereon, and covering the whole with a granulated product (e.g. ammonium chloride or borax powder), the metal grains used being for example stainless-steel grains obtained by crushing scrap, cast-hematite grains, grains of tungsten or molybedenum carbide, or grains of previously metallised diamond.

Such methods, which generally result in the formation of rugous or abrasive surfaces in which the grains have an excellent adhesion strength, require rather complicated operational steps and do not provide an optimum use of the grains since, although the latter adhere very strongly to the supporting surface, they have a random orientation and, accordingly, do not always fulfill to the best their function of providing an abrasive or anti-slip surface.

Now, for a great many industrial purposes it is imperative to have at one's disposal metal articles having fixed to their surfaces, at low cost, strongly adhering protruding metal particles which render them highly rugous or which exhibit highly abrasive characteristics.

The present invention has for its object to provide very rugous anti-slip or abrasive surfaces, by provisionally fixing the metal grains, and orientating the latter so that the major dimension thereof be substantially perpendicular to the supporting surface, by application of a magnetic field which remains operative until the permanent fixation of the metal grains, in opposition to some known methods in which the magnetic field is used only for orientating the grains.

More specifically, the present invention provides a method for metallurgically fixing hard metal particles, having sharp, and even cutting, edges, to project out from the surface of a metal support which has to be made rugous or, in some cases, abrasive, said method being essentially characterised by the combination of the following steps: (1) A bath of a selected metal, held in a permanently fluid state of melt and contained in a tank, has immersed therein the assembly formed by a metal support and by ferromagnetic metal particles having sharp or cutting edges, which particles are firmly held over selected portions of said support under the sole action of the magnetic field provided by a magnet and without using any adhesive product, said particles being converted to elementary magnets by said magnet and spontaneously taking a substantially perpendicular orientation relative to the support surface, with respect to their major dimension. (2) Said assembly is caused to gradually emerge from the metal bath in a permanently fluid state of melt, each ferromagnetic particle retaining, upon emerging, the exact amount of metal required for metallurgically fixing it to stand out from said support, by alloying this metal with the support's metal and with the metal forming the ferromagnetic particle, the adjustment of the angle between the free surface of the fluid metal and each portion of the support surface upon emerging from the bath, enabling the control of the amount of alloying metal which is to be imparted to each ferromagnetic particle.

According to a preferred embodiment of the present method, the fluid metal bath is stationary and the metal support is immersed by said bath after having been introduced thereinto already covered with ferromagnetic particles held in position by the magnetic field of a magnet.

According to a further embodiment of the present method, wherein the bath of metal in a permanently fluid state of melt is again stationary, the metal support immersed therein is covered with ferromagnetic particles only when it is caused to emerge from the bath, each portion of said support to be treated then receiving, across the fused metal and slightly before emerging, the required amount of ferromagnetic particles which are instantaneously fixed and orientated by the magnetic field of a magnet.

According to a still further embodiment of the present method, the assembly formed by the metal support and by ferromagnetic particles held and orientated on said support by means of a magnet, is kept stationary with respect to the tank, and the immersion and the subsequent emersion of said assembly are respectively obtained by the inflow and outflow of the fluid metal over said support achieved by pneumatic means.

According to a still further embodiment of the present method, wherein the assembly formed by the support and by the ferromagnetic particles is still stationary with respect to the tank, the immersion and the subsequent emersion of the assembly are achieved by tilting the tank and then returning it to its initial position.

The invention also relates to the apparatus required for carrying out the present method, said apparatus being so designed that (1) either the bath of metal in a permanently fluid state of melt is stationary or (2) the assembly formed by the metal support and by the ferromagnetic particles being stationary with respect to the tank containing the metal bath, said metal in a fluid state is provisionally caused to cover the surface of said support.

Finally, the present invention contemplates, as new industrial products, articles with a very rugous, anti-slip and, in some cases, highly abrasive surface obtained by means of the aforesaid apparatus and by carrying out the method according to the invention, these articles being characterised in that the metal particles with which they are coated have the major dimension thereof orientated substantially perpendicularly to the support surface.

According to an advantageous embodiment of the present method, the method particles used are inherently ferromagnetic: they consist, for example, of cast hematite particles or tungsten-carbide particles. It is also possible to use non-ferromagnetic particles, such as diamond particles, which are rendered ferromagnetic by a coating of, e.g., cobalt powder.

Among the metals which can be used in a permanently fluid state of melt, the following will be mentioned, it being however understood that this enumeration is not intended to limit the invention: pure or alloyed tin (the melting point of which is at from 180 to 220° C.); pure or alloyed lead (M.P. at from 220 to 400° C.); pure or alloyed zinc (M.P. at from 410 to 460° C.); pure or alloyed copper (M.P. at from 750 to 1100° C.); pure or alloyed silver (M.P. at from 650 to 950° C.).

Since the method according to the invention makes use of magnetic properties, it is to be understood that by no means any given metal in a permanently fluid state of melt would be suitable to any given particle's metal and that due regard should be had to the Curie point of the particle's metal, that is to say to the temperature (or more precisely, the range of a few degrees) from which the metal gradually loses its magnetic properties, said Curie point being, for example, at about 750° C. for iron, 350° C. for nickel and 1150° C. for cobalt. Obviously, the particle's metal must have a Curie point above the temperature at which these particles come into contact with the fluid-fused metal, in order that the magnetic field generated by the magnet be able to hold the particles perpendicularly to the support surface, until these particles are metallurgically fixed to the support.

One of the most important features of the method according to the invention lies in the use of the field developed by a magnet or an electromagnet, on the one hand, for holding the sharp-edged ferromagnetic particles in position on the metal support surface until they are permanently fixed thereto by means of the metal in a permanently fluid state of melt and, on the other hand, for orientating these particles along their major dimension substantially perpendicularly to the surface of said support, in opposition to certain known methods wherein a magnetic field is used only for orientating the grains, the fixation of the latter being effected by another means, for example, by an adhesive product.

Another essential feature of the method according to the invention lies in the use of a metal in a permanently fluid state of melt, intended to alloy, at the point of contact of each ferromagnetic particle to the support surface to be rendered rugous or even abrasive, the support is immersed into a tank containing metal in a fluid state of melt, or else any suitable means is used to bring said fluid metal over the metal support.

It must be noted that the fixation by alloying of any particular metal in a permanently fluid state of melt over the surface of a metal article is old, therefore the present invention is by no means concerned with the formation of an alloy between the metal of the support with the fused metal of the bath; it only aims at making use of the fluid state of the bath metal for distributing said metal on the support and conveniently provide each ferromagnetic metal particle with a suitable amount of fused metal, so as to fix said particles metallurgically to the surface of the metal support which is to be made rugous, said particles, until they are permanently fixed by means of the fused metal, being held and orientated substantially perpendicularly to the support by the magnetic field generated by the magnet, as has already been explained.

The possibility of dosing the amount of metal in a fluid state of melt which is to coat each ferromagnetic particle enables the operator to adjust the adhesive strength and the impact resistance of said particles. Such an adjustment can be effected by modifying the angle between each portion of the support surface and the free surface of metal in a fluid state, when said portion is being emerged. This strength can also be controlled by suitably selecting the size of the metal particles. Since the particles are permanently fixed to the support substantially perpendicularly thereto, with respect to their major dimension, the metal in a permanently fluid state of melt has the possibility, when the support coated with ferromagnetic particles is withdrawn from the bath (FIGURES 3 and 4), or when the fluid metal is removed from the surface of the support (FIGURES 5, 6a and 6b), of flowing between the ferromagnetic particles substantially without covering the sharp edges and the tips of said particles, which would render the particles less rugous or would weaken the anti-slip or abrasive properties of the particles.

According to a further feature of the invention, the operator has the possibility of rendering rugous or abrasive only selected portions of the support surface, which is not possible with conventional methods.

Once the various steps of the present method have been performed, the thus-obtained metal support is covered with hard (and if desired sharp edged) metal particles, substantially perpendicular to the surface of said support, each particle being integral with the support due to the amount of metal (provided by the fluid bath) which has located itself at the point of contact between the lower end of the metal particle and a minute region of the support surface.

The apparatus for carrying out the present method which also falls within the scope of the present invention which comprise a stationary tank containing a metal bath can comprise a stationary tank containing a metal bath in a permanently fluid state of melt, into which is dipped the assembly formed by the magnet, the metal support and the particles held by the magnetic field of said magnet, which assembly is thereafter withdrawn from the bath at a suitably selected angle; the apparatus can also be formed by a stationary tank containing a metal bath in a permanently fluid state of melt, into which is dipped the metal support, to which the ferromagnetic particles are fixed by means of a magnet only a short time prior to its withdrawal from the bath. The method according to the invention can be also performed by holding the assembly formed by the magnet and the particle-coated metal support, stationary, and by bringing the metal in a permanently fluid state for a short time over the support surface to be treated; in the latter case, the apparatus can comprise: (1) a stationary treating tank having fixedly placed therein the assembly constituted by the magnet, the support and the particles retained thereon by the magnet field, and (2) a container for the metal in a permanently fluid state of melt which communicates with the treating tank by suitable conduit means which bring said fluid metal into said tank for the time required for fixing the particles, then direct back said fluid metal into the container, once the latter step is over.

The latter embodiment of the apparatus is especially suitable when the article to be rendered rugous or abrasive is of large size.

The method according to the invention can also be carried out by means of the following apparatus: the assembly, comprising the magnet and the metal support coated with ferromagnetic particles, being stationary with respect to the tank, this tank can be tilted so as to cause the support to be momentarily flooded with metal in a permanently fluid state of melt whereafter the tank resumes the initial position.

The articles having a rugous anti-slip or, if desired, abrasive surface, which can be obtained by the method according to the invention, also fall within the scope of the present invention, as new industrial products; they are characterised by the novel feature of being coated with particles, the orientation of which owing to the influence of the magnetic field) is substantially perpendicular to the surface of the support, with respect to their major dimension, which renders them more rugous or more abrasive than would be possible with known methods. Finally, as has already been stated, the method permits to obtain articles, having only selected portions thereof rendered rugous or abrasive.

The articles obtained by the present method can be used on an industrial scale in many instances where the treated surfaces are subjected to violent stressing or to a high wear due to intense use or where they must have a good thermal resistance or a high friction coefficient. Thus, for example the method according to the invention is useful for manufacturing anti-slip metal coatings, such as metal slabs, metal sheetings, stairway treads, gratings, etc. abrasive tools, such as trimming grinders for objects in plastic materials, slicing discs, driving rollers for cycle wheels, etc.

Further features and advantages of the method according to the invention will become clear from the following description and the accompanying drawings, giving merely by way of explanation and without limiting the invention, six embodiments of the method and showing various articles thus obtained. In these drawings:

FIGURES 1 to 3 illustrate the three steps of the method in the case where the article to be treated, and previously coated with particles held by the magnetic field of an electromagnet is dipped into a stationary tank containing a metal in a permanently fluid state of melt.

FIGURE 4 illustrates an alternative embodiment of the method according to the invention, wherein the tank being stationary, the article to be treated, which is subjected to a magnetic field, is gradually coated with ferromagnetic particles on selected portions thereof, a short time before each of said portions is withdrawn from the bath of metal in a permanently fluid state of melt.

FIGURE 5 illustrates a further embodiment of the method of the invention, wherein the assembly, comprising the magnet and the metal support coated with particles is stationary with respect to the tank containing the metal in a permanently fluid state of melt, and wherein the tank is reciprocally tilted so as to provisionally flood the particle-coated support.

FIGURE 6a illustrates a further embodiment wherein the assembly comprising the magnet and the particle-coated metal support is stationary with respect to the tank containing the metal in a permanently fluid state of melt and wherein this metal is conveyed under pressure to the metal support so as to provisionally flood said support.

FIGURE 6b illustrates a modification of the embodiment of FIGURE 6a, ensuring a still better orientation of the particles.

FIGURE 7 illustrates the treatment for a grinding wheel.

FIGURES 8 to 17 show various rugous or abrasive articles obtained by means of the method according to the invention.

Referring to FIGURE 1, a plane steel sheet 1 is uniformly covered with hard ferromagnetic particles 2 of a suitably selected size; most of these particles are laid along their major dimension and are orientated at random. In FIGURE 2, this sheet 1 covered with particles 2 is horizontally positioned over the north pole N of an electromagnet 28. This electromagnet is energized to create a magnetic field whose lines of force 3 are perpendicular to the north face. The sheet 1 is thus firmly applied against the electromagnet, and the ferromagnetic metal particles 2, under the action of the magnetic field, are spontaneously held and orientated perpendicularly to the sheet with respect to the major dimension thereof.

The electromagnet being still energized, the assembly comprising the pole N of the electromagnet and the sheet 1 covered with orientated particles 2, is dipped into a non-ferromagnetic metal in a permanently fluid state of melt contained in a tank 5 which is continuously heated by heating pipes 6, as shown in FIGURE 3. When the sheet is withdrawn from the bath, each ferromagnetic particle 2, upon emerging (i.e., upon reaching the free surface P of the bath) retains a certain amount of metal in a fluid state of melt: this metal finally fixes the particles to sheet 1, by alloying the metal of the particles to the sheet. The amount of metal 4 which is retained by each particle 2 automatically settles between the tip of said particle and a small region of the surface of sheet 1, due to the inclination imparted to the sheet.

The amount of metal 4 thus retained can be dosed by adjusting the angle between the sheet and magnet assembly and the free surface P. It will be clear that the smaller is the angle, the larger is the amount of metal retained by the particle 2; and, the larger is this amount, the higher is the adhesion strength of the particles 2.

In FIGURE 4 where like parts are identified by the same numerals, the sheet 1 which has been previously immersed into the metal bath 4, is withdrawn therefrom with a movement of translation imparted by rollers 14. As sheet 1 is being withdrawn from the bath, a dispenser 13 pours ferromagnetic particles 2 over the portion of the sheet which is about to emerge from the bath. These particles fall through a shallow thickness of fluid metal 4 and are held and orientated, immediately before emerging, by the magnetic field 3 of an electromagnet 28 having its pole N acting through a non-magnetic wall 15. Upon emersion, the fixation of grains 2 by the metal 4 is effected in a similar way to that described in connection with FIGURE 3.

In FIGURE 5, in which like parts bear the same numerals as in FIGURE 3, two sheets 1 (on which abrasive or rugous particles 2 are both held and orientated by the magnetic field 3 of an electromagnet 28) are laid on inclined draining board edges of tank 5 containing the fluid metal 4 and having heating pipes 6 extending therethrough. In the position illustrated in the figure, the free surface P of the fluid metal does not reach the sheet 1.

By tilting the tank 5 about its axis 12 in the direction $F_1$, the righthand sheet 1 is caused to be flooded with metal in a fluid state of melt. The tank 5 is thereafter returned to its initial position (such as shown in the figure), and the fixation of grains 2 by the metal 4 is effected as in the case of FIGURE 3.

The operation is then repeated with the left-hand sheet by tilting the tank in the direction $F_2$.

Of course, such a treatment can be limited to one sheet 1 only, however, the arrangement shown in FIGURE 5 is more advantageous.

In FIGURE 6a, where like parts bear the same numerals as in FIGURE 3, the sheet 1, having rugous or abrasive particles 2 both held and orientated thereon by the magnetic field 3 of the gap of an electromagnet 28 is put together with the electromagnet in a tank 5 wherein it is kept in a stationary inclined position. A melt vat 7 provided with heating pipes 6 and an exhaust duct 8 contains metal 4 in a fluid state of melt. A conduit 9 connects said vat to the tank 5 and conveys the fused metal 4 into the latter. An air compressor 10 enables the level of the free surface of the fluid metal in the vat 7 and, therefore, in the tank 5, to be modified. When the assembly comprising the sheet and the electromagnet is laid into tank 5, the fluid metal is at its highest level in vat 7 and at its lowest level in tank 5, so that it does not reach sheet 1.

By suitably operating compressor 10, the free surface of the metal in vat 7 is lowered to the level Q, while its free surface in tank 5 rises to level P; thus, the sheet 1 is entirely covered with liquid metal. Thereafter, the metal level in tank 5 is lowered by means of the compressor 10, and the grains 2 are fixed to the support by means of the metal 4 as in the case of FIGURE 3.

Heating pipes 11 connected to the same heat source (not shown) as pipes 6 enable to maintain the metal in a fluid state of melt, once it has been fed into tank 5.

In FIGURE 6b, which shows a modification of the right-hand portion (viz: tank 5) of FIGURE 6a, the orientation of particles 2 on sheet 1 is ensured by two or a series of electromagnets arranged in pairs symmetrically with respect to the longitudinal axis of sheet 1 to be treated. The left-hand portion (viz: vat 7) is not shown, since it is absolutely similar to that of FIGURE 6a, and FIGURE 6b shows only one pair of the above mentioned electromagnets.

As in the case of FIGURE 6a, the sheet 1 to be treated is stationary, while the metal in a permanently fluid state of melt is conveyed under pressure onto the metal support so as to provisionally flood said support.

The advantage of the embodiment shown in FIGURE 6b over that of FIGURE 6a, lies in that it permits to achieve the desired orientation of the ferromagnetic particles 2 (viz: perpendicularly to the support's surface with respect to their major dimension) equally well at all points of said support, since, on the one hand, at each of the two edges of sheet 1, any particle 2 is subjected to the magnetic field of the gap of the corresponding electromagnet 28 (this field being perfectly perpendicular to the support's surface) and, on the other hand, in the middle portion of sheet 1, (i.e., between the two magnets of a pair of magnets symmetric with respect to the longitudinal axis of sheet 1) any particle 2 is subjected to a resultant magnetic field substantially perpendicular to the support's surface.

FIGURE 6b shows sheet 1 in cross-section and therefore as stated above, only one pair of electromagnets is visible therein; in practice, however, each of the two edges of sheet 1 comprises as many electromagnets as are required for treating sheet 1, along its whole length.

The devices illustrated in FIGURES 6a and 6b are especially suitable for treating large size articles.

In FIGURE 8, the sheet 1 is shown in its final condition, after having been subjected to the various steps disclosed in connection with FIGURES 1 to 6b. It is, for example, an anti-slip sheet. If the fluid metal 4 is zinc, the sheet obtained has high anti-slip properties; it is capable of withstanding violent impacts, and it is resistant to abrasion, to atmospheric corrosion, to sea air and sea water.

In FIGURE 9 is shown a metal plate 16 rendered rugous only on selected portions thereof, this achievement being, as has already been pointed out, one of the main features of the present invention; metal particles 2 are located only in areas 17, which appear in this figure as square areas; the spaces 18 remain smooth, since they are not coated with metal particles, thus giving the possibility of cutting the plate into squares, rectangles etc. without deteriorating the shearing blades used for cutting the plate.

In order to manufacture such a plate, it is preferable to use a die piece having square projections similar to those which are to be formed on the plate 16. These squares are wetted with an adhesive substance, and thereafter, the die is dipped into a container (not shown) containing metal particles. Due to the adhesive coating, the particles adhere only to the projecting squares. The die is then applied against the metal plate which is positioned on the north pole of the electromagnet, and the latter is energized. The metal particles 2 are attracted by this north pole onto the plate 16 where they form a plurality of squares, and the method is then carried out as previously described.

It is to be understood that the adhesive is only used for preparing the die and is no longer of any use when the method proper begins being carried out. Of course, the portions coated with metal particles can be given any desired shape and, instead of forming squares, they can be laid according to any desired pattern, or even form letters or a whole word. Moreover, the use of such a die is not imperative, and the die can be replaced by any suitable means (for example shielding) for defining the areas which are to be coated with particles and those which are to remain smooth.

In FIGURE 10, a pre-perforated metal article 19 (the perforations 20 are shown as circular, but could have any other shape) is rendered rugous by the method according to the invention.

In FIGURE 11, the metal article treated is a metal bar of rectangular cross-section rendered rugous around its sides (particles 2 fixed by fluid metal 4).

Such shapes are particularly suitable for sewer grids.

In FIGURE 12 is shown a metal tube 21 whose outer surface is rendered rugous according to the present method.

In FIGURES 13 and 14 are shown respectively a circular cutting blade 22 and a grinding wheel 23 rendered rugous according to the present method (ferromagnetic metal particles 2 metallurgically alloyed by means of metal 4).

In FIGURE 15 is shown an abrasive disc 24 rendered rugous by the method according to the invention (ferromagnetic metal particles 2 metallurgically alloyed by means of metal 4).

In FIGURES 16 and 17 are shown, in each case, a cylindrical driving roller including portions coated with ferromagnetic particles 2 and smooth portions; on the roller shown in FIGURE 16, the rugous portions are arranged in strips 25 parallel to the axis of the roller, while on the roller shown in FIGURE 17, these portions are arranged according to a herringbone pattern 26.

Finally, FIGURE 7 illustrates the treatment of a metal grinding wheel 27 which has been rendered rugous by ferromagnetic particles 2 fixed metallurgically to project out by means of the metal 4, the arrows 3 indicate as for FIGURES 2, 3 and 4, the lines of force of the magnetic field, whose purpose is both to immobilize the particles 2 until they be definitely fixed in position by the metal 4 and to orientate these particles until they be substantially perpendicular to the treated surface.

To produce such a grinding wheel, the treatment is as follows: The blank 27 is applied against the pole N of an electromagnet 28a so that the entire grinding wheel (which is to be coated with particles 2 on its working surface 29) should be penetrated by the lines of force of the magnetic field of electromagnet 28a.

On the other hand, particles 2 are distributed on an adhesive tape (not shown) whose dimensions are equal to the working portion 29 of the grinding wheel 27. This tape is applied over said working portion; the electromagnet 28a is energized and the particles 2 are immobilized each of them being converted to an elementary magnet, the working portion 29 acting as a north pole. The various portions of the working surface 29 of the grinding wheel 27 (which act as a north pole of magnet 28a) are gradually immersed into metal 4 in a permanently fluid state of melt, where they are submitted to the pole S of a second electromagnet 28b; the particles 2 are thus orientated (by the magnetic field of the gap between working surface 29 and the pole S of magnet 28b) perpendicularly to surface 29 with respect to their major dimension.

On being withdrawn from the metal 4, each of these particles retains a certain amount of metal 4 which permanently fixes it perpendicularly to the surface of the grinding wheel, this orientation being imparted by the magnetic field 3 of electromagnet 28b as in the previous instances.

It is to be noted that the adhesive tape has only a provisional action and, that once the particles 2 are in contact with the working surface 29 of the grinding wheel, they are held only by the magnetic field of the electromagnet 28a, then by the magnetic field of electromagnet 28b (and orientated by the latter), in opposition to certain methods wherein an adhesive product is used to hold the particles in position, the function of the magnetic field being only to suitably orientate these particles.

Such a grinding wheel is especially suitable for grinding plastic materials.

The method according to the invention has many advantages over known methods: It permits the treatment of metal articles of all sizes and shapes up to the dimensions of the tank 5; by means of the apparatus shown in FIGURES 6a and 6b, very thick plates can be coated in situ; it is not necessary to heat the entire mass of the metal article to be treated, but it is merely required to raise to the desired temperature an extremely small depth of the article to be made rugous or abrasive, to perform the alloying of the particles thereon, and accordingly, the duration of heating is independent of the thickness of the article itself; the method is absolutely dependable, since the alloying of the metal 4 to the metal of the article and the metal of the particles 2 takes place within the bath in a permanently fluid state of melt, therefore is strictly protected from air. Any risk of oxidation of either the surface of the article treated or of the grains 2 is accordingly avoided.

Lastly, the plane sheets 1 which are to be rendered rugous or abrasive, remain perfectly plane after the processing, as they are held in this position by the magnetic force which prevents them from being deformed when being heated within the metal 4 in a permanently fluid state of melt.

It is to be understood that the foregoing description has been given only by way of explanation, and without limiting the invention, and that various modifications of detail can be made therein within the scope of the appended claims.

In particular, it must be noted that, in each instance, any number of magnets or electromagnets can be used, and that the orientation of the particles 2 perpendicularly to the support's surface with respect to their major dimension, can be achieved either on a single pole or in a gap.

I claim:

1. A method for preparing a rugous surface, comprising a plurality of discrete ferromagnetic weldable particles of hard metal selected from the group consisting of cast hematite, tungsten-carbide, molybdenum carbide and cobalt coated diamond having sharp, and contingently cutting, edges and welded metallurgically to a steel plate by means of a metal in a permanently fluid state of melt selected from the group consisting of pure metals and alloys of tin, lead, zinc, copper and silver having melting points between 180 and 1100° C., which method comprises the successive steps of:

submitting said steel plate both to flooding by the bath of metal in a permanently fluid state of melt, and to the magnetic field of at least one magnet which firmly and provisionally holds said ferromagnetic particles spread on the portions of said plate to be made rugous and which orientates said spread particles substantially perpendicularly to said plate with respect to their major dimension, the temperature of said bath being lower than the Curie-point of the metal of said particles and greater than 180° C., clearing said thus prepared support from said bath of fluid metal, and, maintaining the field of said magnet until said orientated metal particles are permanetly fixed to said plate, to obtain a rugous surface with the required amount of alloy metal at the point of contact between each particle and said plate.

2. A method for preparing a rugous surface, comprising a plurality of discrete ferromagnetic weldable particles of hard metal selected from the group consisting of cast hematite, tungsten-carbide, molybdenum carbide and cobalt coated diamond having sharp, and contingently cutting, edges and welded metallurgically to a steel plate by means of a fluid metal in a permanent state of melt selected from the group consisting of pure metals and metal alloys of tin, lead, zinc, copper and silver having melting points between 180° C. and 1100° C., which method comprises the successive steps of:

submitting said steel plate both to dipping into the bath of metal in a permanently fluid state of melt contained in a fixed tank, and to the magnetic field of at least one magnet which firmly and provisionally holds said ferromagnetic particles spread on the portions of said plate to be made rugous prior to the dipping of said plate, and which orientates said spread particles substantially perpendicularly to said plate with respect to their major dimension, the temperature of said bath being lower than the Curie-point of the metal of said particles and greater than 180° C., emerging said thus prepared plate from said bath of fluid metal, controlling the angle between the free surface of said fluid metal and each portion of said plate, when it is about to be emerged from said bath, and, maintaining the field of said magnet until the permanent fixation of said orientated metal particles on said plate, to obtain a rugous surface with the required amount of alloy metal at the point of contact between each particle and said plate.

3. A method for preparing a rugous surface, comprising a plurality of discrete ferromagnetic weldable particles of hard metal selected from the group consisting of cast hematite, tungsten-carbide, molybdenum carbide and cobalt coated diamond having sharp, and contingently cutting, edges and welded metallurgically to a steel plate by means of a fluid metal selected from the group consisting of pure metals and metal alloys of tin, lead, zinc, copper and silver in a permanent state of melt, which method comprises the successive steps of:

submitting said steel plate both to dipping into the bath of metal at a temperature greater than 180° C. in a permanently fluid state of melt contained in a fixed tank, and to the magnetic field of at least one magnet which firmly and provisionally holds said ferromagnetic particles spread on the portions of said plate to be made rugous after the dipping of said plate, and which orientates said spread particles substantially perpendicularly to said plate with respect to their major dimension, the temperature of said bath being lower than the Curie-point of the metal of said particles, emerging said thus prepared plate from said bath of fluid metal, controlling the angle between the free surface of said fluid metal and each portion of said plate, when it is about to be emerged from said bath, and, maintaining the field of said magnet, until the permanent fixation of said orientated metal particles on said plate, to obtain a rugous surface with the required amount of alloy metal at the point of contact between each particle and said plate.

4. A method for preparing a rugous surface comprising a plurality of discrete ferromagnetic weldable particles of hard metal selected from the group consisting of cast hematite, tungsten-carbide, molybdenum carbide and cobalt coated diamond having sharp, and contingently cutting, edges and weldable metallurgically to a steel plate by means of a fluid metal selected from the group consisting of tin, tin alloys, lead, lead alloys, zinc, zinc alloys, copper, copper alloys, silver and silver alloys in a permanent state of melt, which method comprises the successive steps of:

submitting said steel plate, maintained in a fixed position, both to flooding by raising the free level of the bath of metal in a permanently fluid state of melt and to the magnetic field of at least one magnet which firmly and provisionally holds said ferromagnetic particles spread on the portions of said plate to be made rugous prior to the raising of said bath and which orientates said spread particles substantially perpendicularly to said plate with respect to their major dimension, the temperature of said bath being lower than the Curie-point of the metal of said particles and greater than 180° C., clearing said thus prepared plate from said bath of fluid metal by lowering the free level of said bath, controlling the angle between the free surface of said fluid metal and each portion of said plate when it is about to be cleared from said bath and, maintaining the field of said magnet, until the permanent fixation of said orientated metal particles on said plate, to obtain a rugous surface with the required amount of alloy metal at the point of contact between each particle and said plate.

5. A method for preparing a rugous surface, comprising a plurality of discrete ferromagnetic weldable particles of hard metal selected from the group consisting of cast hematite, tungsten-carbide, molybdenum carbide and cobalt coated diamond having sharp, and contingently cutting, edges and welded metallurgically to a steel plate by means of a fluid metal selected from the group consisting of pure metals and alloys of tin, lead, zinc, copper and silver in a permanent state of melt, which method comprises the successive steps of:

submitting said steel plate both to flooding by tilting the bath of metal in a permanently fluid state of melt contained in a tiltable tank, and to the magnetic field of at least one magnet which firmly and provisionally holds said ferromagnetic particles spread on the portions of said plate to be made rugous prior to said tilting of the bath, and which orientates said spread particles substantially perpendicularly to said plate with respect to their major dimension, the temperature of said bath being lower than the Curie-point of the metal of said particles and greater than 180° C., clearing said thus prepared plate from said bath of fluid metal by returning said bath to its initial position, controlling the angle between the free surface of said fluid metal and each portion of said plate when it is about to be cleared from said bath and, maintaining the field of said magnet, until the permanent fixation of said orientated metal particles on said plate, to obtain a rugous surface with the required amount of alloy metal at the point of contact between each particle and said plate.

6. A method for preparing a rugous surface comprising a plurality of discrete ferromagnetic weldable particles of hard metal having sharp, and contingently cutting, edges and welded metallurgically to a steel plate by means of a metal selected from the group consisting of pure metals and alloys of tin, lead, zinc, copper and silver in a permanently fluid state of melt, which method comprises the successive steps of:

submitting said steel plate both to flooding by the bath of metal in a permanently fluid state of melt, and to the magnetic field of at least one magnet which firmly and provisionally holds said ferromagnetic particles spread on the portions of said plate to be made rugous, said particles being of a metal selected from cast-hematite, tungsten carbide, and molybdenum carbide, and which orientates said particles with respect to their major dimension, the temperature of said bath being lower than the Curie-point of the metal of said particles and greater than 180° C., clearing said thus prepared plate from said bath of fluid metal, and, maintaining the field of said magnet, until the permanent fixation of said orientated metal particles on said plate, to obtain a rugous surface with the required amount of alloy metal at the point of contact between each particle and said plate.

7. A method for preparing a rugous surface, comprising a plurality of discrete ferromagnetic weldable particles of hard metal having sharp, and contingently cutting, edges and welded metallurgically to a steel plate by means of a metal selected from the group consisting of pure metals and alloys of tin, lead, zinc, copper and silver in a permanently fluid state of melt, which method comprises the successive steps of:

submitting said steel plate both to flooding by the bath of metal in a permanently fluid state of melt, and to the magnetic field of at least one magnet which firmly and provisionally holds said ferromagnetic particles spread on the portions of said plate to be made rugous, said particles being ferromagnetic due to a coating of cobalt powder, and which orientates said particles with respect to their major dimension, the temperature of said bath being lower than the Curie-point of the metal of said particles and greater than 180° C., clearing said thus prepared support from said bath of fluid metal, and, maintaining the field of said magnet, until the permanent fixation of said orientated metal particles on said plate, to obtain a rugous surface with the required amount of alloy metal at the point of contact between each particle and said plate.

8. A method for preparing a rugous surface, comprising a plurality of discrete ferromagnetic weldable particles of hard metal selected from the group consisting of cast hematite, tungsten-carbide, molybdenum carbide and cobalt coated diamond having sharp, and contingently cutting, edges and welded metallurgically to a steel plate by means of a fluid metal in a permanent state of melt, which method comprises the successive steps of:

submitting said steel plate both to flooding by the bath of metal in a permanent state of melt, said bath metal being selected from zinc, lead, tin, copper, silver having melting points from 180–1100° C. and to the magnetic field of at least one magnet which firmly and provisionally holds said ferromagnetic particles spread on the portion of said plate to be made rugous and which orientates said spread particles substantially perpendicularly to said plate with respect to their major dimension, the temperature of said bath being lower than the Curie-point of the metal of said particles, clearing said thus prepared plate from said bath of fluid metal, and, maintaining the field of said magnet, until the permanent fixation of said orientated metal particles on said plate, to obtain a rugous surface with the required amount of alloy metal at the point of contact between each particle and said plate.

9. A method for preparing a rugous surface, comprising a plurality of discrete ferromagnetic weldable particles of hard metal selected from the group consisting of cast hematite, tungsten-carbide, molybdenum carbide and cobalt coated diamond having sharp, and contingently cutting, edges and welded metallurgically to a steel plate by means of a fluid metal in a permanent state of melt, which method comprises the successive steps of:

submitting said steel plate both to flooding by the bath of metal in a permanently state of melt, said bath metal being selected from a zinc alloy having a melting point of 410–460° C., a lead alloy having a melting point of 220–400° C., a tin alloy having a melting point of 100–220° C., a copper alloy having a melting point of 750–1100° C., a silver alloy having a melting point of 650–950° C. and to the magnetic field of at least one magnet which firmly and provisionally holds said ferromagnetic particles spread on the portion of said plate to be made rugous and which orientates said spread particles substantially perpendicularly to said plate with respect to their major dimension, the temperature of said bath being lower than the Curie-point of the metal of said particles, clearing said thus prepared support from said bath of fluid metal, and, maintaining the field of said magnet, until the permanent fixation of said orientated metal particles on said plate, to obtain a rugous surface with the required amount of alloy metal at the point of contact between each particle and said plate.

10. A method for preparing a rugous surface, comprising a plurality of discrete ferromagnetic weldable particles of hard metal selected from the group consisting of cast hematite, tungsten-carbide, molybdenum carbide and cobalt coated diamond having sharp, and contingently cutting, edges, and welded metallurgically to a steel sheet by means of a metal selected from the group consisting of pure and alloy metals of tin, lead, zinc, copper and silver having a melting point between 180° and 1100° C. in a permanently fluid state of melt, which method comprises the successive steps of:

submitting said steel sheet both to flooding by the bath of metal in a permanently fluid state of melt, and to the magnetic field of at least one pair of magnets symmetrically arranged with respect to the longitudinal axis of said sheet for firmly and provisionally holding said ferromagnetic particles spread on the portions of said sheets to be made rugous, and which orientates said spread particles substantially perpendicularly to said sheet with respect to their major dimension, the temperature of said bath being lower than the Curie-point of the metal of said particles and greater than 180° C., clearing said thus prepared steel sheet from said bath of fluid metal, controlling the angle between the free surface of said fluid metal and each portion of said sheet when it is about to be cleared from said bath and, maintaining the field of said pair of magnets, until the permanent fixation of said orientated metal particles on said metal sheet, to obtain a rugous surface with the required amount of alloy metal at the point of contact between each particle and said metal sheet.

11. Rugous, anti-slip and contingently abrasive, articles coated with metal particles selected from the group consisting of cast hematite, tungsten-carbide, molybdenum carbide and cobalt coated diamond the orientation of which is substantially perpendicular to the coated portions of said articles, with respect to their major dimension, each metal particle being integral with said coated portions due to the amount of metal located at the point of contact between the lower end of the metal particle and a minute region of the coated portion, said articles being formed in accordance with the process of claim 1.

References Cited by the Examiner

UNITED STATES PATENTS

| | | | |
|---|---|---|---|
| 2,020,117 | 5/1930 | Johnston | 51—309 |
| 2,128,028 | 8/1938 | Hampton | 118—423 |
| 2,184,896 | 12/1939 | Oglesby | 51—298.1 |
| 2,292,991 | 8/1942 | Crompton | 51—309 |
| 2,339,208 | 1/1944 | Der Pyl | 51—309 |
| 2,343,957 | 3/1944 | Crompton | 51—309 |
| 2,347,920 | 5/1944 | Mays | 51—309 |
| 2,359,920 | 10/1944 | Keeleric | 51—309 |
| 2,360,798 | 10/1944 | Seligman | 51—309 |
| 2,417,920 | 3/1947 | Flink | 118—423 |
| 2,427,565 | 9/1947 | Liger | 51—309 |
| 2,906,612 | 9/1959 | Anthony et al. | 51—309 |

ALEXANDER H. BRODMERKEL, *Primary Examiner.*

J. R. SPECK, *Examiner.*

D. J. ARNOLD, *Assistant Examiner.*